J. DRUCKER.
SADDLE FOR DRAFT ANIMALS.
APPLICATION FILED APR. 26, 1910.
977,790.
Patented Dec. 6, 1910.
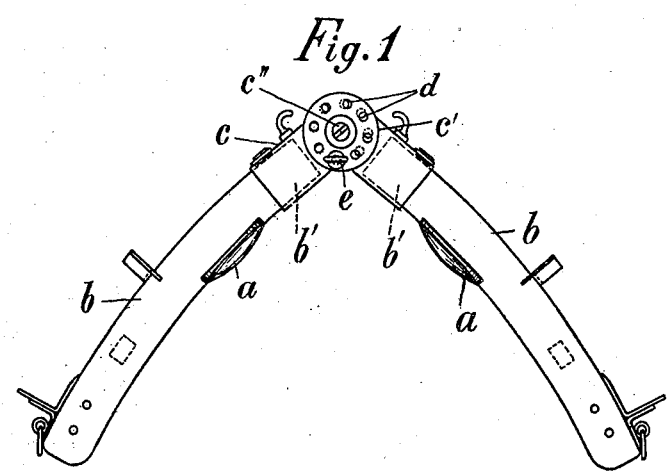
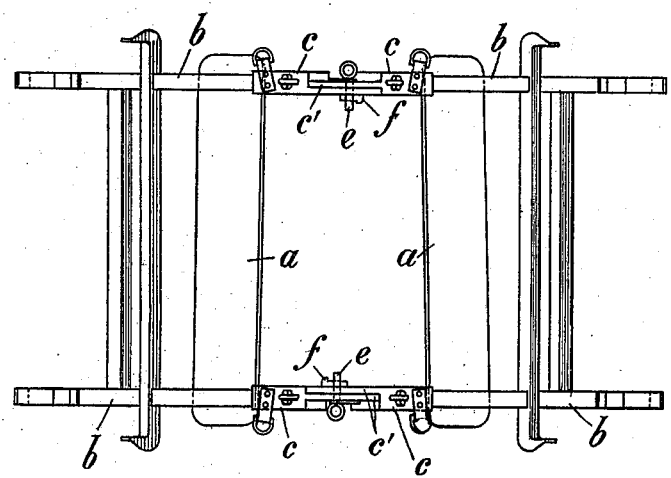
WITNESSES:
INVENTOR,
JULIUS DRUCKER,
by
Attorney.

UNITED STATES PATENT OFFICE.

JULIUS DRUCKER, OF BRÜNN, AUSTRIA-HUNGARY.

SADDLE FOR DRAFT-ANIMALS.

977,790.  Specification of Letters Patent.  Patented Dec. 6, 1910.

Application filed April 26, 1910. Serial No. 557,795.

*To all whom it may concern:*

Be it known that I, JULIUS DRUCKER, a subject of the Austro-Hungarian Emperor, residing at Brünn, Austria-Hungary, have invented a new and useful Saddle for Draft-Animals; and I do hereby declare the following to be a full, clear, and exact description of the same.

The present invention relates to pack saddles, and the improvements have reference to means whereby the saddle arms may be locked in any adjusted relation, permitting the same saddle to be used with animals of different girths (donkeys, horses and the like).

In the accompanying drawings, Figure 1 is an end view of a saddle embodying my improvements; Fig. 2 is a top view of said saddle.

The saddle is shown as made of two halves, each consisting of front and rear arms ($b$) conected by a saddle-bar $a$. The front arms are pivotally connected or hinged together, and the rear arms are also thus connected. The connection referred to is assured by caps $c$ which have sockets to receive the ends ($b^1$) of the arms, and which also have leaves or disks ($c^1$). When the parts are connected, the disk of one cap lies next that of the other cap, and adjacent disks are pivotally connected by means of a pivot piece ($c^{11}$), such as a screw.

In the drawings, I have shown the disks having openings differently disposed in adjacent disks, to require adjustment of the parts to bring different pairs of openings into register. Each disk is shown as provided with a number of openings ($d$) disposed concentrically with relation to the pivot piece ($c^{11}$), adjacent holes of the one disk being equidistant, and adjacent holes of the other disk being also equidistant, but more closely spaced than those of the first disk.

The adjustment of the saddle to any desired breadth is effected by turning the arms, $b$, into the desired position—an opening of one disk of each pair of disks being in register with an opening of the other disk of that pair—and the parts are then locked or held, in the desired position, by means of a removable bolt ($e$) passed through the registering holes of adjacent disks. Each bolt is temporarily held in place by a peg or key ($f$) which passes through a slot near the end of the bolt.

The arrangement shown and described permits the arms to be adjusted in any desired position, at an angle or flat, and locked or held in each selected position.

What I claim is:

1. In an adjustable saddle, a pair of saddle-bars, arms supporting said saddle-bars, caps provided with sockets for receiving and holding the bars, said caps being provided with perforated disks turning pivotally one upon the other, in combination with means for fixedly adjusting the caps in any desired position.

2. An adjustable saddle, comprising saddle-arms, caps provided with sockets engaging the saddle-arms and having their upper ends shaped into perforated disks, the disks being pivotally connected, and means for holding the adjacent disks in fixed relation.

3. In an adjustable saddle, saddle arms having disks at their upper ends and pivotally connected for relatively adjusting said arms, one of the disks having a plurality of adjacent equidistant holes, and the other disk having a plurality of holes equidistant but more closely spaced than those of the first disk, and removable means passing through openings in the adjacent disks for holding the latter in the adjusted relation.

In testimony whereof, I have signed my name to this specification in the presence of two subscribing witnesses.

JULIUS DRUCKER.

Witnesses:
 MORITZ SCHMOCHA,
 LEOPOLD DODÁCHY.